Nov. 23, 1954  C. F. STANLEY  2,695,200
PILLOW BLOCK
Filed June 12, 1951
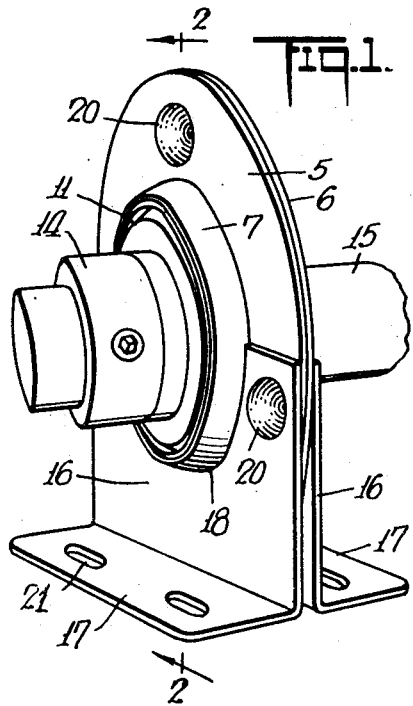
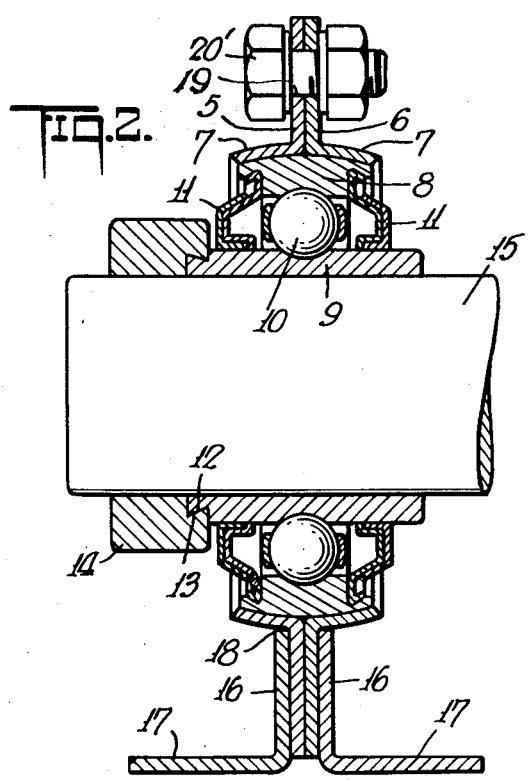
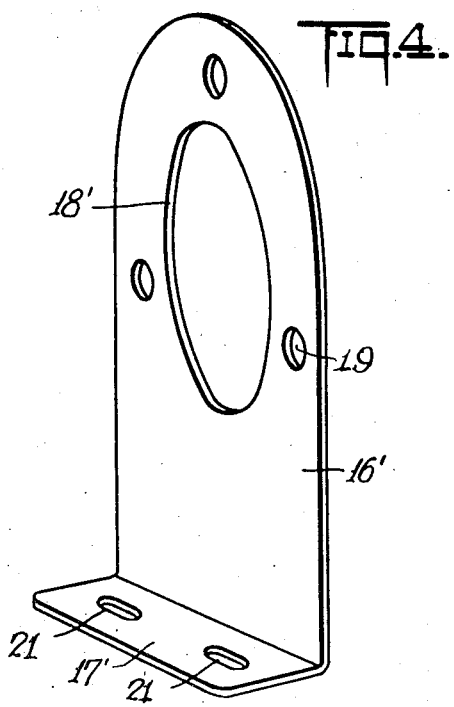
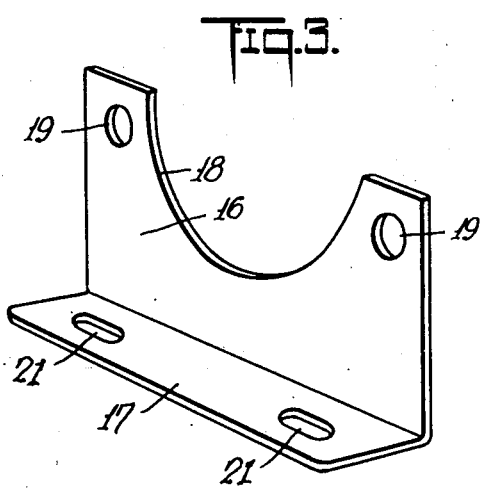
INVENTOR
Charles F. Stanley
BY
Mitchell Bechert
ATTORNEYS

United States Patent Office 2,695,200
Patented Nov. 23, 1954

2,695,200

PILLOW BLOCK

Charles F. Stanley, New Britain, Conn., assignor to The Fafnir Bearing Company, New Britain, Conn., a corporation of Connecticut Application June 12, 1951, Serial No. 231,158

3 Claims. (Cl. 308—72)

My invention relates to a pillow block.

It is an object of the invention to provide an improved pillow block which is inexpensive in construction, and which is quite flexible in that it may be arranged to meet various conditions.

Other objects and features of invention will be pointed out or will become apparent to those skilled in the art.

In a preferred form my improved pillow block includes a pair of housing plates preferably of round disc form fitting face to face and each housing plate has an outwardly extending annular flange of generally spherical contour so that together they provide a spherical housing for a spherical outer surface of an antifriction bearing ring. The housing and housed bearing are supported upon a pillow block base preferably consisting of two duplicate cradle base members which may be of generally L-shaped cross-section so as to provide base flanges to be secured to a support and upstanding plates having cradle bearing surfaces for receiving the annular outwardly extending flanges on the housing plates for supporting the housing and housed bearing. The pillow block cradle bearing surfaces may be about semicircular or such bearing surfaces may be fully circular so as adequately to support the annular bearing housing flanges. The cradle base members may be secured to the housing plates by various means such as welding, stitching, rivets and bolts and nuts.

In the drawings which show, for illustrative purposes only, preferred forms of the invention—

Fig. 1 is a perspective view of a pillow block illustrative of the invention;

Fig. 2 is a central vertical sectional view on an enlarged scale of the pillow block shown in Fig. 1, taken substantially in the plane of the line 2—2 of Fig. 1 and showing bolt instead of rivet securing means;

Fig. 3 is a detail perspective view of one of the pillow block base plates shown in Figs. 1 and 2;

Fig. 4 is a similar view of a base plate of slightly modified form.

In the preferred form of pillow block illustrated, the bearing housing preferably comprises a pair of housing plates which may be in the form of flat round discs 5—6 normally secured together in face to face abutting relationship. These plates 5—6 have outwardly directed annular flanges 7—7 which are preferably symmetrically arranged on the plates and each flange preferably has a spherical seating surface on the inside so that the two flanges together form a housing of generally spherical form for the outer ring 8 of an antifriction bearing. The outer ring 8 preferably has a spherical outer surface so as to be self-aligning and maintain a good seating surface in the housing flanges 7—7. The antifriction bearing may comprise the outer ring 8, a long inner ring 9, and interposed antifriction bearing members such as balls 10. The bearing may be sealed at both sides as by means of labyrinth seals 11. The long inner ring at one end may have a circumferential eccentric locking or cam surface 12 to be received in a corresponding eccentric counterbore 13 in a locking ring 14. Thus when the inner ring 9 and the locking ring 14 are rotated slightly relatively to each other, both rings will be securely locked to the shaft 15 supported by the inner bearing ring.

The bearing and its housing are designed to be supported by a pillow block base which consists of one or two base plates. In the forms shown in Figs. 1, 2, and 3, the pillow block base consists of two duplicate plates 16, which plates have right-angularly extending foot flanges 17. The upstanding flanges or plates 16 are provided with an opening or aperture defined by cradle surfaces 18 for receiving the outwardly directed flanges 7—7 of the housing plates so as to cradle and support the housing between the two plates 16—16 and on the cradle surfaces 18. In the form shown in Figs. 1, 2, and 3 the plates 16 extend upwardly to about the horizontal diameter of the bearing housing so that the cradle surfaces 18 are of substantially semicircular shape.

The housing plates 5—6 may be secured to each other and to the base plates 16—16 by various means as indicated above, but in the forms shown the base plates 16 may have apertures 19—19 therein and rivets 20 or bolts 20' extend through the apertures 19 and through registering apertures in the housing plates 5—6. Thus the housing plates are rigidly held together and between the two plates 16—16 and the flanges 7—7 on the housing plates preferably rest on the cradle surfaces 18—18 so as to adequately support the entire bearing housing and bearing assembly. The upper bolt 20' shown in Fig. 2 merely has to pass through the housing plates 5—6 and therefore may be shorter than the bolts which pass through four thicknesses of metal.

In the form shown in Fig. 4 each upstanding foundation plate 16' has a completely enclosed circular opening or cradle surface 18' so as to completely surround the housing flanges 7—7 and give adequate support thereto no matter what the position of the pillow block. The foot flange 17' may be the same as the foot flange 17 shown in the other figures and all of the foot flanges may have openings 21—21 for receiving securing members for securing the pillow block to a support. When two plates of the sort shown in Fig. 4 are employed in place of the shorter plates shown in Fig. 3, the bearing housing flanges will be completely surrounded by portions of the plates 16' and all of the securing bolts or rivets will pass through two foundation plates and two housing plates. In that form of pillow block base shown in Fig. 4 the pillow block may be suspended in inverted or any other position without sacrificing the cradling support for the bearing housing.

It will be seen that I have provided a very simple bearing housing and pillow block support means therefor so as to provide a very simple and inexpensive pillow block. The parts are all of pressed steel or the like and are exceedingly simple to manufacture and corresponding parts are preferably all duplicates of each other to make for interchangeable manufacture and reduction in cost. The foundation or base plates 16—16' may be made in various heights so as to provide a pillow block which stands high or low off of the foundation to which the base flanges 17—17' are secured. The bearing will be adequately supported in the pressed metal parts and yet will be self-aligning when formed as shown herein. The base or foundation plates may be made of just the desired height and the bearing housings proper, may be made to fit all heights of base or foundation plates. When the parts are secured by bolts, different bases, bearings, etc., may be combined in the field. When rivets or other permanent fastenings are used changes can not readily be made in the field but neither are there any parts to work loose and cause trouble.

While I have described my invention in detail for the preferred form shown, it will be understood that modifications may be made within the scope of the invention as defined in the appended claims.

I claim:

1. In a pillow block, a bearing housing comprising a pair of housing plates in face to face abutting relationship, said plates having opposed annular outwardly extending registering flanges to provide a housing for a bearing between them, a bearing in said housing and centered substantially in the plane between said housing plates, a pillow block base comprising a pair of opposed upstanding base plates fitting on the outsides of said housing plates, said base plates having registering arcuate openings therein of a radius substantially equal to the radius of said annular flanges at the bases thereof to receive and cradle said annular flanges at the bases thereof, fastening means for securing said housing plates and said upstanding base plates together in unit-handling relationship, and feet on said base plates to be secured to a support.

2. In the combination defined in claim 1, said seating surfaces on said base plates for cradling said annular flanges on said housing plates being about semi-circular in extent.

3. In the combination defined in claim 1, said seating surfaces on said base plates being substantially circular to substantially surround said annular flanges on said housing plates.

References Cited in the file of this patent

UNITED STATES PATENTS

| Number | Name | Date |
|---|---|---|
| 1,322,831 | Seiss | Nov. 25, 1919 |
| 1,592,974 | Forester, Jr. | July 20, 1926 |
| 1,606,747 | Carter | Nov. 16, 1926 |
| 1,670,231 | Besse | May 15, 1928 |
| 1,904,307 | Hamaker | Apr. 18, 1933 |
| 1,921,239 | Miller | Aug. 8, 1933 |
| 2,521,731 | Kennedy | Sept. 12, 1950 |

FOREIGN PATENTS

| Number | Country | Date |
|---|---|---|
| 370,832 | Great Britain | Apr. 14, 1932 |